United States Patent
Baehrle-Miller et al.

(10) Patent No.: US 9,321,439 B2
(45) Date of Patent: Apr. 26, 2016

(54) METHOD, REGULATING AND CONTROL APPLIANCE, AND PARKING BRAKE COMPRISING SUCH A REGULATING AND CONTROL APPLIANCE, FOR ADJUSTING A CLAMPING FORCE EXERTED BY A PARKING BRAKE

(75) Inventors: Frank Baehrle-Miller, Schoenaich (DE); Tobias Putzer, Bad Friedrichshall (DE)

(73) Assignee: ROBERT BOSCH GMBH, Stuttgart (DE)

( * ) Notice: Subject to any disclaimer, the term of this patent is extended or adjusted under 35 U.S.C. 154(b) by 445 days.

(21) Appl. No.: 13/818,765

(22) PCT Filed: Jul. 14, 2011

(86) PCT No.: PCT/EP2011/062035
§ 371 (c)(1),
(2), (4) Date: Apr. 23, 2013

(87) PCT Pub. No.: WO2012/031804
PCT Pub. Date: Mar. 15, 2012

(65) Prior Publication Data
US 2013/0211684 A1    Aug. 15, 2013

(30) Foreign Application Priority Data

Sep. 10, 2010  (DE) .......................... 10 2010 040 565

(51) Int. Cl.
*B60T 8/17*    (2006.01)
*B60T 8/172*   (2006.01)
*B60T 7/10*    (2006.01)
(Continued)

(52) U.S. Cl.
CPC . *B60T 8/17* (2013.01); *B60T 7/107* (2013.01); *B60T 8/172* (2013.01); *B60T 13/588* (2013.01); *B60T 13/745* (2013.01); *B60T 13/746* (2013.01); *B60T 17/221* (2013.01)

(58) Field of Classification Search
CPC ....... B60T 7/085; B60T 7/107; B60T 13/588; B60T 13/66; B60T 13/74; B60T 13/745; B60T 13/746; B60T 17/221
See application file for complete search history.

(56) References Cited

U.S. PATENT DOCUMENTS 6,270,172 B1 *  8/2001  Shirai et al. ................... 303/152
7,898,196 B2 *  3/2011  Horikoshi et al. ............ 318/362
(Continued)

FOREIGN PATENT DOCUMENTS

DE    10 2006 011546    9/2007
GB    2 349 675         11/2000
(Continued)

OTHER PUBLICATIONS

International Search Report, dated Jan. 3, 2012, issued in corresponding PCT/EP2011/062035.

*Primary Examiner* — Helal A Algahaim
*Assistant Examiner* — Donald J Wallace
(74) *Attorney, Agent, or Firm* — Kenyon & Kenyon LLP

(57) ABSTRACT

In a method for adjusting the clamping force exerted by a parking brake, which force is applied by an electric-motor braking apparatus that encompasses an electric braking motor and power-supply and control units, and as necessary by an additional braking apparatus, an equivalent resistance is ascertained from a measurement of current and voltage and is used as the basis for calculating the maximum generatable clamping force.

12 Claims, 2 Drawing Sheets

(51) Int. Cl.
    *B60T 13/58*   (2006.01)
    *B60T 13/74*   (2006.01)
    *B60T 17/22*   (2006.01)

(56)           References Cited

U.S. PATENT DOCUMENTS

| 2004/0026989 | A1* | 2/2004  | Suzuki et al. | 303/89  |
| 2005/0046271 | A1* | 3/2005  | Suzuki et al. | 303/20  |
| 2006/0261764 | A1* | 11/2006 | Erben et al.  | 318/139 |
| 2006/0267402 | A1* | 11/2006 | Leiter et al. | 303/20  |
| 2010/0212314 | A1* | 8/2010  | Isono         | 60/545  |
| 2010/0308645 | A1* | 12/2010 | Maron et al.  | 303/20  |
| 2011/0266106 | A1* | 11/2011 | Suzuki        | 188/360 |
| 2014/0202801 | A1* | 7/2014  | Berger et al. | 188/106 P |

FOREIGN PATENT DOCUMENTS

| JP | 5506196 | 9/1993 | | |
| JP | 10-24813 | 1/1998 | | |
| JP | 2000-16279 | 1/2000 | | |
| JP | 2002-303646 | 10/2002 | | |
| JP | 2006-22959 | 1/2006 | | |
| JP | 2009-115313 | 5/2009 | | |
| WO | WO 92/06876 | 4/1992 | | |
| WO | WO 2009053429 A1 * | 4/2009 | | B60T 13/58 |

\* cited by examiner

METHOD, REGULATING AND CONTROL APPLIANCE, AND PARKING BRAKE COMPRISING SUCH A REGULATING AND CONTROL APPLIANCE, FOR ADJUSTING A CLAMPING FORCE EXERTED BY A PARKING BRAKE

CROSS REFERENCE TO RELATED APPLICATIONS

The present application is the national stage entry of International Application No. PCT/EP2011/062035, filed on Jul. 14, 2011, which claims priority to Application No. DE 10 2010 040 565.5, filed in the Federal Republic of Germany on Sep. 10, 2010.

FIELD OF INVENTION

The present invention relates to a method for adjusting the clamping force exerted by a parking brake in a vehicle.

BACKGROUND INFORMATION

With the aid of automatic parking brakes, vehicles are immobilized at a standstill by generation of a continuous braking force. Parking brakes having an electric motor, whose displacement motion acts via a gear drive, for example a spindle drive, directly on the brake pistons at the wheel brakes, are known. The electric motors are usually dimensioned so that a vehicle can be held in zero-energy fashion on slopes of at least 20%. With electric motors of smaller dimensions, or on steeper slopes, a hydraulic braking apparatus is additionally actuated in order to elevate the clamping force to the value required to immobilize the vehicle.

SUMMARY

An object on which the present invention is based is that of furnishing the clamping force in a parking brake in a vehicle in economical fashion.

The method according to the present invention relates to the adjustment of the clamping force exerted by a parking brake in a vehicle, the parking brake having on the one hand an electric-motor braking apparatus that encompasses an electric braking motor, and on the other hand an additional braking apparatus. By way of the two braking apparatuses, an adjustable proportion of the total clamping force for immobilizing the vehicle can be adjusted modifiably between zero and a maximum value. The clamping force is preferably applied via the electric braking motor; the additional braking apparatus, which is in particular a hydraulic braking apparatus, takes effect in supplementary fashion for the instance in which the clamping force cannot be made available at the required level by the electric braking motor alone.

When the clamping force is made available via the electric braking motor, consideration must be given to the fact that the motor power output can change as a result of aging or weathering influences, in particular a temperature dependency of the electrical resistance values; in addition, significant differences in motor power output can occur as a result of production variation. If the maximum clamping force to be made available via the electric braking motor has decreased as a result of, for example, an aging-related change, a supplementary clamping force must be generated by way of the additional braking apparatus, even though the time required until the total clamping force is reached can increase. If, for example, because of a production variation, a clamping force exceeding the nominal value can be made available by a presently installed braking motor, the additional braking apparatus conversely needs to take effect only at a higher required clamping force than is the case in standard situations in which only the nominal clamping force is reached by the braking motor.

To allow an appropriate and prompt reaction to different situations of this kind, according to the present invention the maximum clamping force presently generatable by the electric braking motor is ascertained with increased accuracy. For this, firstly a total resistance in the electric-motor braking apparatus is ascertained from the sum of the equivalent motor resistance and an equivalent control device resistance, the latter referring to the resistance in the power-supply and control units of the braking motor. The equivalent control device resistance is ascertained by way of state variables or operating variables or other parameters of the braking apparatus, in particular from measured variables such as, for example, from a measurement of current and voltage.

In a further step, the total resistance thereby calculated is used as the basis for ascertaining the maximum generatable clamping force and/or for ascertaining the motor current required for a target clamping force. The maximum generatable clamping force that can be generated by way of the electric braking motor, or the motor current required for a target clamping force, is thus available as an information item for the particular situation. All short-term and long-term influences on the electric braking motor that affect braking-motor power output, i.e., for example temperature influences, aging effects, production variations, etc. are acquired in this context.

For the case in which the maximum generatable clamping force falls below an associated threshold value, an additional braking force is applied by way of the additional braking apparatus. The same is true for the situation in which the motor current required for the target braking force exceeds an associated threshold value; in this case as well, an additional braking force is generated by way of the additional braking apparatus.

Thanks to the more-accurate knowledge of the maximum generatable clamping force or the motor current required for the target clamping force, it is possible to react more quickly as compared with the existing art, and the additional braking apparatus can be activated as necessary so that the entire operation for making the requisite clamping force available in the parking brake is carried out in a shorter time. A more precise application of control is also possible, so that a more energy-saving operating mode results. For the case in which a clamping force that goes beyond nominal values can be made available via the electric braking motor, it is sufficient to generate a correspondingly lower supplementary clamping force by way of the additional braking apparatus. All in all, noise emissions are reduced by the method according to the present invention because the additional braking apparatus is activated in demand-compatible fashion; in addition, component stress on the additional braking apparatus is diminished, as is the vehicle electrical system load because of the smaller number of applications with assistance from the additional braking apparatus. Influences on the clamping force to be made available via the electric braking motor that are attributable to temperature, motor aging, charge variation, and fluctuations in voltage provision are reduced or compensated for.

According to a further useful exemplary embodiment, the measurement of voltage and current for ascertaining the equivalent control device resistance is carried out between the braking motor and the power-supply and control units electrically connected to the braking motor. The power-supply and control units usefully encompass a control device including a power electronics system to apply control to the electric braking motor, as well as a battery for supplying power, including the connecting power leads. The measurement of voltage and current occurs at the output side of the control device.

The measurement is carried out preferably within a defined current region that is marked by an upper and a lower threshold value. The threshold values are advantageously set so that the current exhibits an at least approximately straight-line profile within the region marked by the threshold values. For example, the lower threshold value is set at 4 A and the upper threshold value at 8 A. The associated voltage values are measured at these current threshold values, the equivalent control device resistance being calculated from the ratio of the voltage difference to the current difference at the relevant measurement points.

With a knowledge of the equivalent control device resistance and of the equivalent motor resistance, which encompasses the internal resistance of the motor and the lead resistances within the motor, a total resistance can be calculated from the sum of the individual equivalent resistances; from this, in consideration of the no-load voltage, the maximum possible motor current can be calculated. The no-load voltage is likewise ascertained, in particular, by measurement. With a knowledge of the maximum current, the maximum motor torque that the electric braking motor can deliver can be calculated. The maximum achievable clamping force can be ascertained therefrom, with further consideration of gear reduction ratios as well as efficiency values. In addition, the motor current required for a given target clamping force can be calculated. By way of the above-described comparison with associated threshold values, a determination is made as to whether the target clamping force can be made available solely by way of an actuation of the electric braking motor, or whether the additional braking apparatus must be switched in.

According to a further useful exemplary embodiment, provision is made that the measurement of current and voltage for ascertaining the equivalent control device resistance is carried out during the switching-on operation. The current curve rises to a maximum immediately after switching on and then drops asymptotically, the measurement of current and voltage being placed in an approximately linear region within the branch of the current curve that drops from the maximum. An upper and a lower current threshold value are defined, the attainment of which can be measured, as can the associated voltage values.

The method according to the present invention is executed in a closed- or open-loop control device that is present in the vehicle. The closed- or open-loop control device can be the electronic stability program (ESP) control device.

The closed- or open-loop control device is associated with the parking brake in the vehicle. The additional braking apparatus is preferably a hydraulic braking apparatus, in particular the hydraulic wheel brakes, which are also actuated in an ordinary braking operation. The electric braking motor acts on the brake pistons of the hydraulic braking system which constitutes the additional braking apparatus for the parking brake.

Further advantages and useful exemplary embodiments are described in the following with reference to the accompanying drawings.

DETAILED DESCRIPTION

Figure 1:
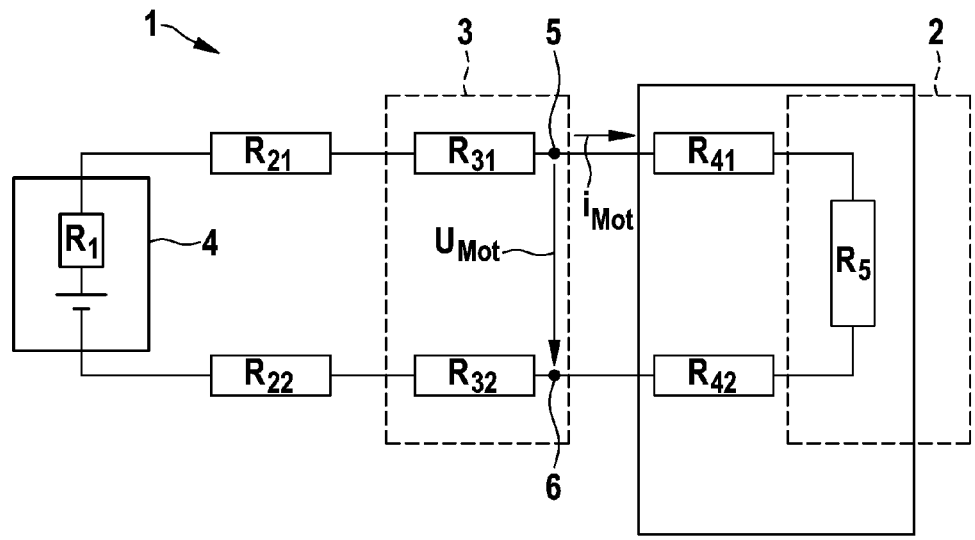
FIG. 1 schematically depicts an electric braking motor as constituent of a parking brake in a vehicle, including a control device as well as a power supply via a battery.

FIG. 1 schematically depicts a parking brake 1 for a vehicle, having an electric braking motor 2 upon the actuation of which a braking force is exerted on the brake piston of a hydraulic braking apparatus that constitutes the wheel brake. The electric braking motor sits directly on the brake caliper of the wheel brake. The force of the electric braking motor is transferred via a gear drive, such as, e.g., a spindle drive, to the relevant brake piston. The electric braking motor, together with the reduction gear drive, is dimensioned so that without actuation of the hydraulic braking apparatus, the vehicle can be held by solely the electric braking motor on a slope of at least 20%.

Associated with electric braking motor 2 is a control device 3 that contains a power electronics system through which braking motor 2 is supplied with power. Control device 3 can be a constituent of an ESP control device, or can be present as a supplement on such a control device. It is moreover also possible for the control device to be embodied as a separate unit, and to communicate with the ESP control device via an interface.

A battery 4 that is connected via power leads to control device 3 is associated with control device 3. Battery 4 has an internal electrical resistance $R_1$, the connecting power leads have a resistance $R_{21}$ and $R_{22}$, respectively. The internal resistance of control device 3 is characterized by resistances $R_{31}$ and $R_{32}$.

All the resistances of battery 4, of control device 3, and of the connecting power leads between the battery and control device can be additively combined into an equivalent control device resistance $R_{ER}$.

Electric braking motor 2 has an internal electrical resistance $R_5$. Power leads that supply power to braking motor 2 are characterized by electrical resistances $R_{41}$ and $R_{42}$. These power leads are associated with braking motor 2. The resistance $R_{41}$ and $R_{42}$ of the power leads, as well as internal resistance $R_5$, together additively constitute the equivalent motor resistance $R_{est}$. The total resistance $R_{tot}$ is made up of the sum of the equivalent control device resistance $R_{ER}$ and the equivalent motor resistance $R_{est}$.

$$R_{tot}=R_{ER}+R_{est}.$$

The equivalent control device resistance $R_{ER}$ is ascertained by measuring current values $i_{4A}$, $i_{8A}$ and associated voltage values $U_{4A}$, $U_{8A}$. The measurement occurs at the output side of control device 3 between measurement points 5 and 6, between which the motor voltage $U_{Mot}$ is present and from which the current $i_{Mot}$ flows into electric braking motor 2. As is evident from FIG. 1 in combination with FIG. 2, an upper current threshold value $i_{th1}$ and a lower current threshold value $i_{th2}$, at which the measurement occurs, are defined. The measurement is carried out during the switching-on operation, during which the current curve of the motor current $i_{Mot}$ first rises to a maximum and then drops steeply again. The threshold values $i_{th1}$ and $i_{th2}$ are located in the decreasing branch of the current curve in an at least approximately straight-line segment. Measurement begins when the upper threshold value $i_{th1}$ is reached; the associated measured value is labeled $i_{8A}$. At the same time, the voltage value $U_{8A}$ is ascertained.

The current curve then proceeds until it drops below the lower current threshold value $i_{th2}$; the associated measured current value is labeled $i_{4A}$. Associated with this is the measured voltage value $U_{4A}$.

The measured current values $i_{8A}$ and $i_{4A}$ are located at least approximately at 8 A and 4 A respectively, and can deviate slightly from the respective associated threshold values $i_{th1}$ and $i_{th2}$, as is apparent in particular from the current value $i_{4A}$. It is possible in particular for the associated measured current values to be slightly below the threshold values. The aforesaid current threshold values are presented only by way of example. They vary as a function of the actual lead resistances and of the motor used, the lead resistances and motor design being system-relevant. The actual threshold values are thus recalculated and adapted as applicable for each system.

In order to ascertain the equivalent control device resistance $R_{ER}$, the ratio of the differences of the voltage values and current values is calculated as $$R_{ER} = \frac{U_{4A} - U_{8A}}{i_{8A} - i_{4A}} = \frac{U_{St,m}}{i_{St,m}}.$$

The voltage difference is indicated as $U_{St,m}$, and the current difference as $i_{St,m}$.

The equivalent control device resistance $R_{ER}$ is thus available, and with a knowledge of the equivalent motor resistance $R_{est}$ the total resistance $R_{tot}$ can be arrived at from the sum of the two resistance values.

With a knowledge of the no-load voltage $U_{noload}$, which can likewise be determined by measurement, the maximum possible motor current $i_{Mot,max}$ can be calculated from the ratio of the no-load voltage to the total resistance:

$$i_{Mot,max} = \frac{U_{noload}}{R_{tot}}.$$

From the maximum current $i_{Mot,max}$ of the braking motor, and in consideration of the motor constant $K_M$, a load adaptation factor a, and the no-load current $i_{noload}$ that is likewise ascertained by measurement, the equation $$M_{Mot,max} = K_M(i_{Mot,max} \cdot a - i_{noload})$$

can be used to ascertain the maximum motor torque $M_{Mot,max}$ that the braking motor can make available during or immediately after the no-load phase. The load adaptation factor a serves to adapt the motor constant for motor currents >30% to 70% of stall current, and typically lies in a value range between 0.8 and 0.98.

The delivered motor torque is transferred by the reduction gear drive, the delivered gear drive torque being calculated, in consideration of the gear drive reduction ratio $ü_{gear}$ and the gear drive efficiency $\eta_{gear}$, as $$M_{gear} = \frac{M_{Mot} \cdot \eta_{gear}}{ü_{gear}}.$$

The torque delivered from the gear drive is transformed by the spindle into an axial clamping force $F_N$ defined as $$F_N = \frac{2\pi \cdot M_{gear} \cdot \eta_{Sp}}{S_{Sp}}.$$

The clamping force $F_N$ serves to engage the parking brake. The thread pitch $S_{Sp}$ of the spindle, as well as the spindle efficiency $\eta_{Sp}$, are taken into consideration in calculating the clamping force $F_N$.

With the information above, the equation $$F_{N,max} = \frac{2\pi \cdot K_M(i_{Mot,max} \cdot a - i_{noload}) \cdot \eta_{gear} \cdot \eta_{Sp}}{ü_{gear} \cdot s_{Sp}}$$

can be used to calculate the maximum clamping force $F_{N,max}$ that can be achieved solely by way of an actuation of the electric braking motor.

For a given target clamping force $F_{N,tgt}$, the equation $$i_{Mot,tgt} = \frac{1}{a}\left[\frac{F_{N,tgt} \cdot ü_{gear} \cdot s_{Sp}}{2\pi \cdot K_M \cdot \eta_{gear} \cdot \eta_{Sp}}\right]$$

can also be used alternative or additionally to calculate the motor current $i_{Mot,tgt}$ required in order to make available the target clamping force $F_{N,tgt}$ in the braking motor.

With a knowledge of the maximum clamping force $F_{N,max}$ and/or of the motor current $i_{Mot,tgt}$ it is possible to decide, by way of a comparison with associated threshold values, whether an additional actuation of the hydraulic braking apparatus is necessary as a supplement to the electric braking motor in order to establish the required clamping force. If the maximum clamping force $F_{N,max}$ does not reach the target clamping force, the hydraulic braking apparatus must be switched in.

The same is true for the case in which the motor current $i_{Mot,tgt}$ necessary for a given target clamping force $F_{N,tgt}$ is greater than a maximum possible current value.

Figure 3:
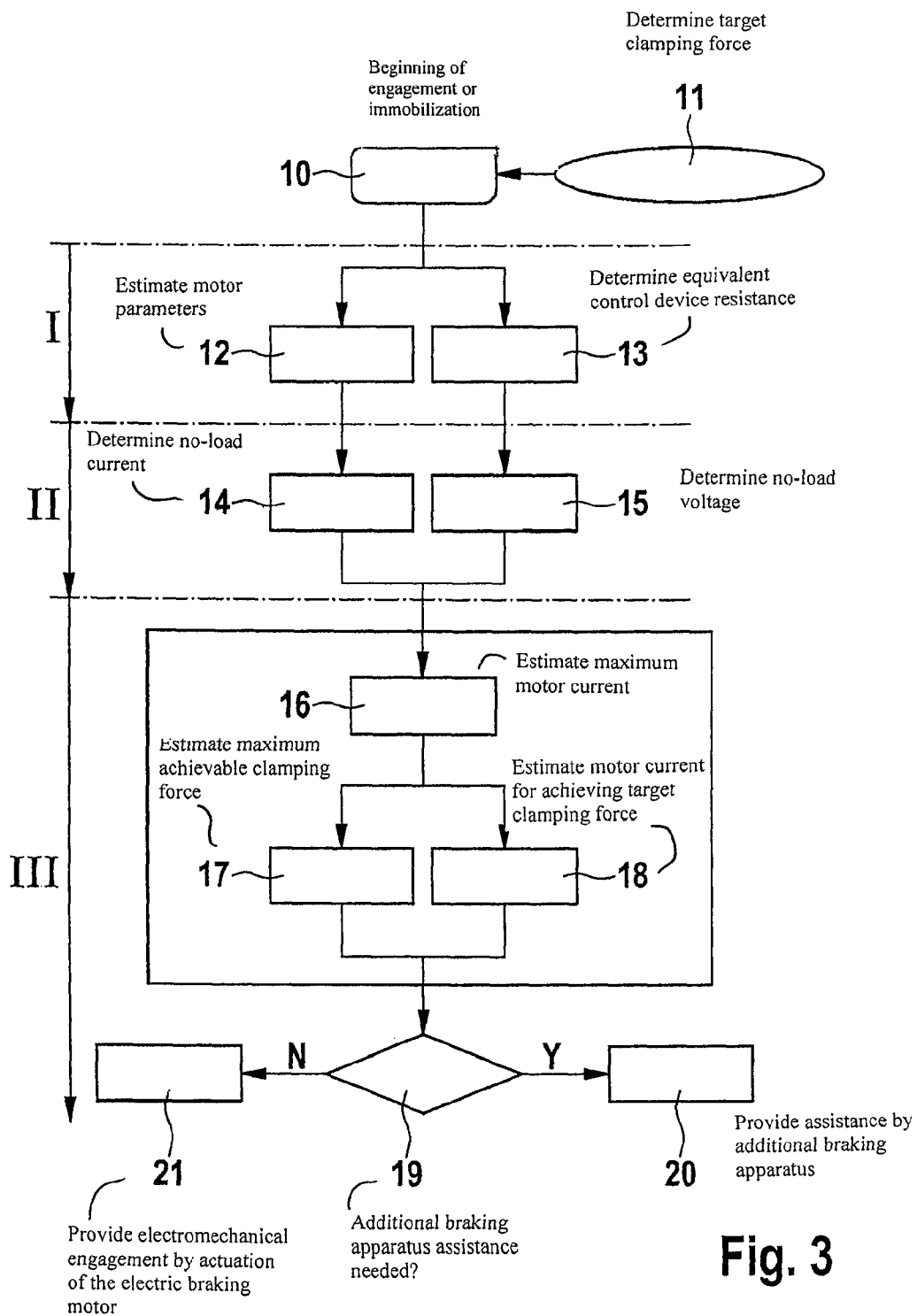
FIG. 3 is a flow chart with the method steps for ascertaining the maximum achievable clamping force by way of the electric braking motor or the motor current required for a given target clamping force.

FIG. 3 shows the execution of the method in a flow chart. Method step 10 marks the beginning of the engagement or immobilization operation upon actuation of the parking brake. With the start of the operation, a target clamping force $F_{N,tgt}$ is ascertained in accordance with method step 11, consideration being given here in particular to the slope on which the vehicle is presently standing. For slopes of up to 20%, the clamping force as a rule can be made available solely via the electric braking motor of the parking brake.

Figure 2:
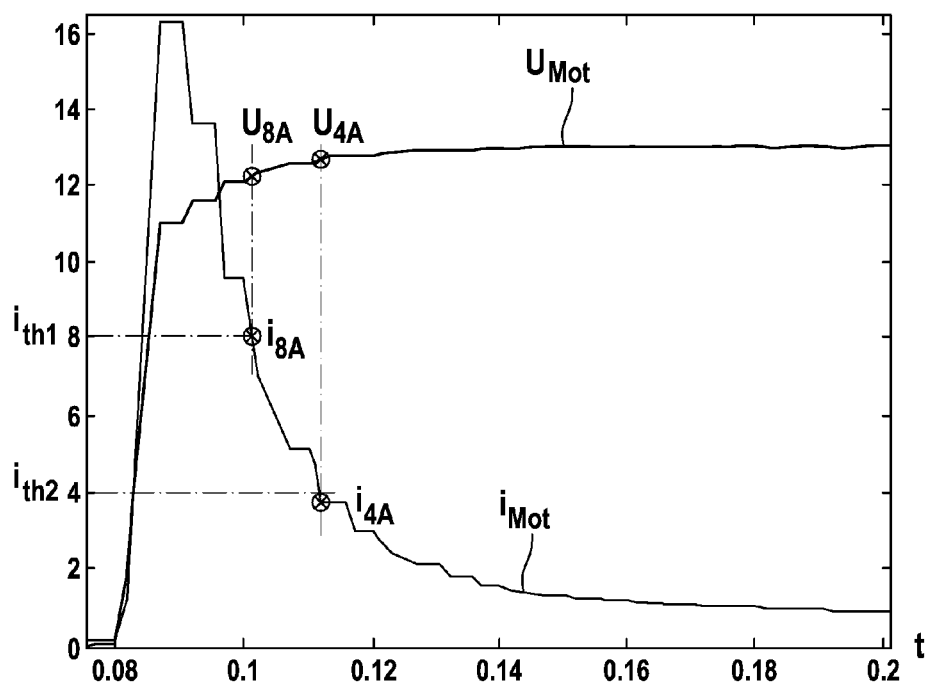
FIG. 2 is a diagram with the time-dependent current and voltage curves at the beginning of actuation of the electric braking motor.

Method steps 12 and 13 mark a first phase in which the engagement request is detected and the braking motor mounted on the wheel brake is switched on. In phase I, in accordance with method step 12, an estimate is carried out of motor parameters, in particular of the resistances in the motor and in the supply leads to the motor, from which the equivalent motor resistance $R_{est}$ is calculated. In method step 13, the equivalent control device resistance $R_{ER}$ is ascertained on the basis of measurements of current and voltage. The respective curves for current and voltage $i_{Mot}$ and $U_{Mot}$ depicted in FIG. 2 are also encompassed in phase I.

This is followed by phase II, which marks the no-load phase in which a no-load current, a no-load voltage, and a no-load rotation speed are established. The clamping force that is to be applied via the electric braking motor continues to be equal to zero in this phase. Phase II encompasses the ascertaining of the no-load current $i_{noload}$ in accordance with method step 14, and the ascertaining of the no-load voltage $U_{noload}$ in accordance with method step 15, by measurement.

In the next phase III, force buildup occurs. At the beginning of phase III, in a calculation block having method steps 16, 17, and 18, firstly an estimate of the maximum motor current $i_{Mot,max}$ (method step 16), and then in method step 17 an estimate of the maximum achievable clamping force $F_{N,max}$, and in method step 18 an estimate of the motor current $i_{Mot,tgt}$ for achieving a target clamping force $F_{N,tgt}$, are carried out. A query is then made in a decision block, in accordance with method step 19, as to whether assistance by way of the additional braking apparatus is necessary. If so, execution proceeds along the "Yes" branch to method step 20, in which the pressure assistance is made available by way of the hydraulically embodied additional braking apparatus. Otherwise the clamping force attainable by way of the electric braking motor is sufficient, and execution proceeds along the "No" branch to method step 21, in which electromechanical engagement occurs by actuation of the electric braking motor.

What is claimed is:

1. A method for adjusting a clamping force exerted by a parking brake, which force is applied by an electric-motor braking apparatus that encompasses an electric braking motor, power-supply, control units, and an additional braking apparatus, the method comprising:
    ascertaining a total resistance in the electric-motor braking apparatus from a sum of equivalent motor resistance and an equivalent control device resistance, the equivalent control device resistance referring to a resistance in the power-supply and control units of the braking motor, and being ascertained from parameters of the electric-motor braking apparatus; and
    using the total resistance as a basis for at least one of ascertaining a maximum generatable clamping force, and ascertaining a motor current required for a target clamping force, an additional braking force being applied by the additional braking apparatus for a case in which the maximum generatable clamping force falls below an associated threshold value or the motor current required for the target clamping force exceeds an associated threshold value.

2. The method according to claim 1, wherein the equivalent control device resistance is ascertained from a measurement of current and voltage in the electric-motor braking apparatus.

3. The method according to claim 2, wherein the measurement of current and voltage for ascertaining the equivalent control device resistance is carried out between the braking motor and the power-supply and control units that are electrically connected to the braking motor.

4. The method according to claim 2, wherein the measurement of current and voltage for ascertaining the equivalent control device resistance is carried out during a switching-on operation.

5. The method according to claim 1, wherein the power-supply and control units encompass a battery and a control device, and resistance values in the battery, in the control device, and in connecting power leads are determined for ascertaining the equivalent control device resistance.

6. The method according to claim 1, wherein an upper current threshold value and a lower current threshold value are taken into account for marking a measurement region for ascertaining the equivalent control device resistance.

7. The method according to claim 6, wherein the upper and the lower current threshold values delimit an at least approximately straight-line current profile.

8. The method according to claim 6, wherein the lower current threshold value is equal to at least approximately 4 A and the upper current threshold value is equal to at least approximately 8 A.

9. The method according to claim 1, wherein a no-load voltage is ascertained and is used as a basis for calculating a maximum possible motor current.

10. A closed- or open-loop control device for carrying out a method for adjusting a clamping force exerted by a parking brake, which force is applied by an electric-motor braking apparatus that encompasses an electric braking motor, power-supply, control units, and an additional braking apparatus, the device comprising:
    a control unit including a processor configured to perform the following:
        ascertaining a total resistance in the electric-motor braking apparatus from a sum of equivalent motor resistance and an equivalent control device resistance, the equivalent control device resistance referring to a resistance in the power-supply and control units of the braking motor, and being ascertained from parameters of the electric-motor braking apparatus; and
        using the total resistance as a basis for at least one of ascertaining a maximum generatable clamping force, and ascertaining a motor current required for a target clamping force, an additional braking force being applied by the additional braking apparatus for a case in which the maximum generatable clamping force falls below an associated threshold value or the motor current required for the target clamping force exceeds an associated threshold value.

11. A parking brake system in a vehicle, comprising:
    an electric-motor braking apparatus; and
    a closed- or open-loop control device for adjusting a clamping force exerted by the parking brake system, which force is applied by the electric-motor braking apparatus that encompasses an electric braking motor, power-supply, and control units, and by an additional braking apparatus, the control device including a processor configured to perform the following:
        ascertaining a total resistance in the electric-motor braking apparatus from a sum of equivalent motor resistance and an equivalent control device resistance, the equivalent control device resistance referring to a resistance in the power-supply and control units of the braking motor, and being ascertained from parameters of the electric-motor braking apparatus; and
        using the total resistance as a basis for at least one of ascertaining a maximum generatable clamping force, and ascertaining a motor current required for a target clamping force, an additional braking force being applied by the additional braking apparatus for a case in which the maximum generatable clamping force falls below an associated threshold value or the motor current required for the target clamping force exceeds an associated threshold value.

12. The parking brake system according to claim 11, wherein the additional braking apparatus is embodied as a hydraulic braking apparatus.

* * * * *